United States Patent
Dietrick

[15] 3,707,067
[45] Dec. 26, 1972

[54] GAS SCRUBBING DEVICE

[72] Inventor: Gerald P. Dietrick, 523 Ridgeview Drive, Florence, Ky. 41042

[22] Filed: July 13, 1970

[21] Appl. No.: 54,323

[52] U.S. Cl..................55/228, 261/76, 261/78 A, 261/116, 261/DIG. 54, 210/387
[51] Int. Cl. ..............................................B01d 47/06
[58] Field of Search....55/228; 261/76, 116, DIG. 54, 261/78 A; 210/387

[56] References Cited

UNITED STATES PATENTS

| | | | |
|---|---|---|---|
| 990,278 | 4/1911 | Leblanc | 261/76 |
| 968,332 | 8/1910 | Dow | 261/76 |
| 1,071,875 | 9/1913 | Buschei | 261/76 |
| 1,117,626 | 11/1914 | Bassler | 261/76 |
| 3,305,094 | 2/1967 | Casson | 210/387 |
| 3,221,885 | 12/1965 | Hirs | 210/387 |
| 3,333,705 | 8/1967 | Lee | 210/387 |

Primary Examiner—Tim R. Miles
Assistant Examiner—Steven H. Markowitz
Attorney—Pearce & Schaeperklaus

[57] ABSTRACT

A gas scrubber including a plurality of jet pumps arranged around a central conduit through which particle carrying gas is directed. The gas is drawn through tubular mixing chambers which receive liquid from the jet pumps. From the mixing chambers, a mixture of gas and liquid is projected into a tank where the scrubbed gas is separated from the liquid. An appropriate filter or the like separates the particles from the liquid.

9 Claims, 8 Drawing Figures

PATENTED DEC 26 1972

INVENTOR.
GERALD P. DIETRICK

By Pearce and Schaeperklaus

ATTORNEYS

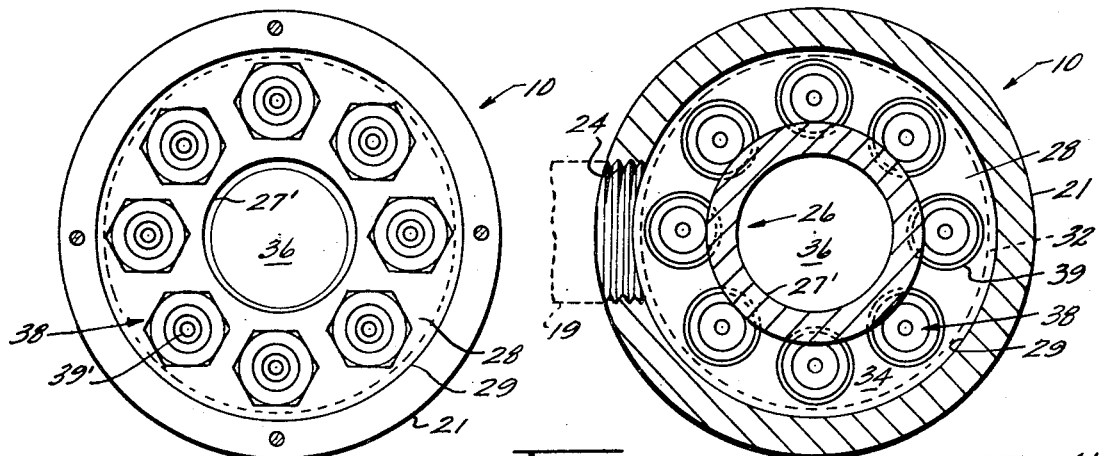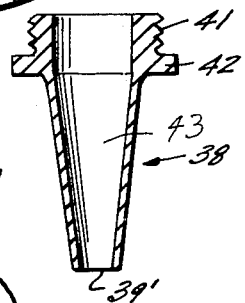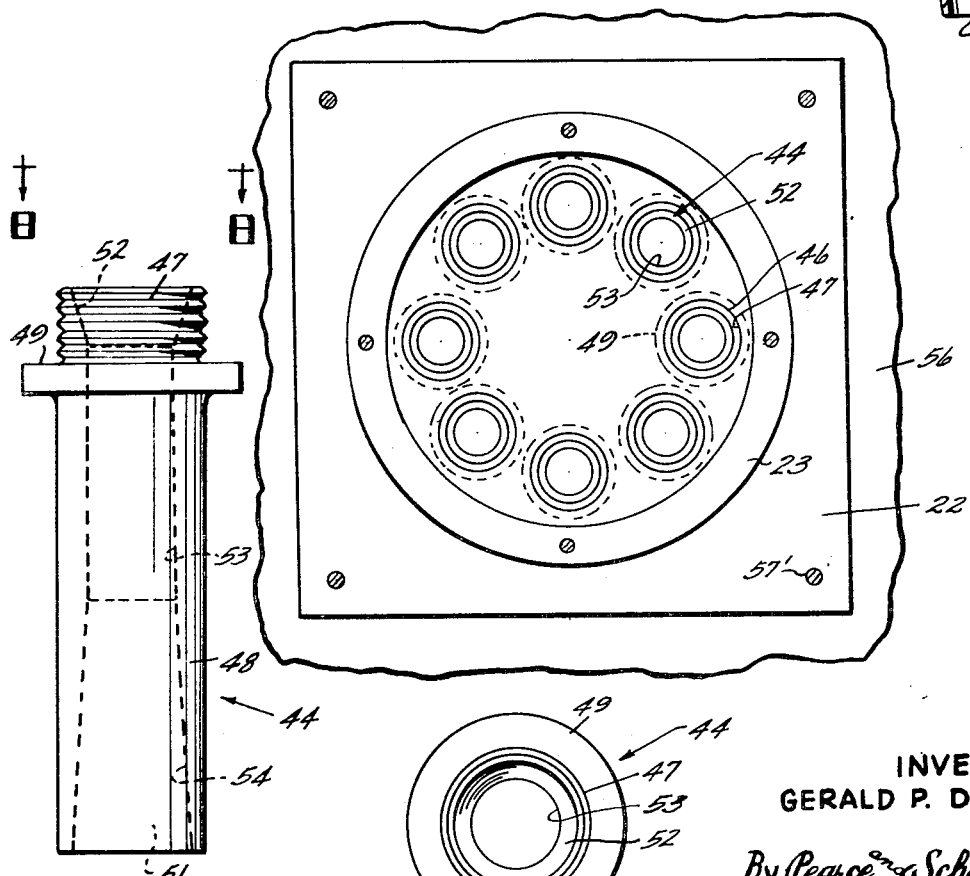

GAS SCRUBBING DEVICE

This invention relates to gas scrubbing devices. More particularly, this invention relates to a device in which a liquid is mixed with a gas to remove particles carried by the gas from the gas.

An object of this invention is to provide a liquid-powered ejector pump which draws particle carrying gas from a line and mixes the gas intimately with the liquid which powers the ejector to wash the particles from the gas.

A further object of this invention is to provide such an ejector pump which is compact in structure and which is arranged to handle a large volume of particle carrying gas.

Briefly, this invention provides a liquid powered ejector which includes a plurality of jet pumps arranged around a central conduit through which particle carrying gas is directed to be drawn through tubular mixing chambers which receive liquid from the jet pumps. From the mixing chambers, a mixture of gas and liquid is projected into a tank where the gas is separated from the liquid. An appropriate filter or the like separates the particles from the liquid in the tank, and the liquid can be pumped back to the jet pumps.

The above and other features and objects of the invention will be apparent to those skilled in the art to which this invention pertains from the following detailed description and the drawings, in which:

FIG. 3 is a view in section taken on the line 3—3 in FIG. 2;

FIG. 4 is a view in section taken on the line 4—4 in FIG. 2;

FIG. 5 is a view in section taken on the line 5—5 in FIG. 2;

FIG. 6 is a view in side elevation on an enlarged scale of a mixing chamber member forming a part of the gas scrubbing device;

FIG. 7 is a view in transverse section taken on an enlarged scale of a jet member forming a part of the gas scrubbing device; and FIG. 8 is a view in end elevation of the mixing chamber member looking in the direction of the arrows 8—8 in FIG. 6.

In the following detailed description and the drawings, like reference characters indicate like parts.

Figure 1:
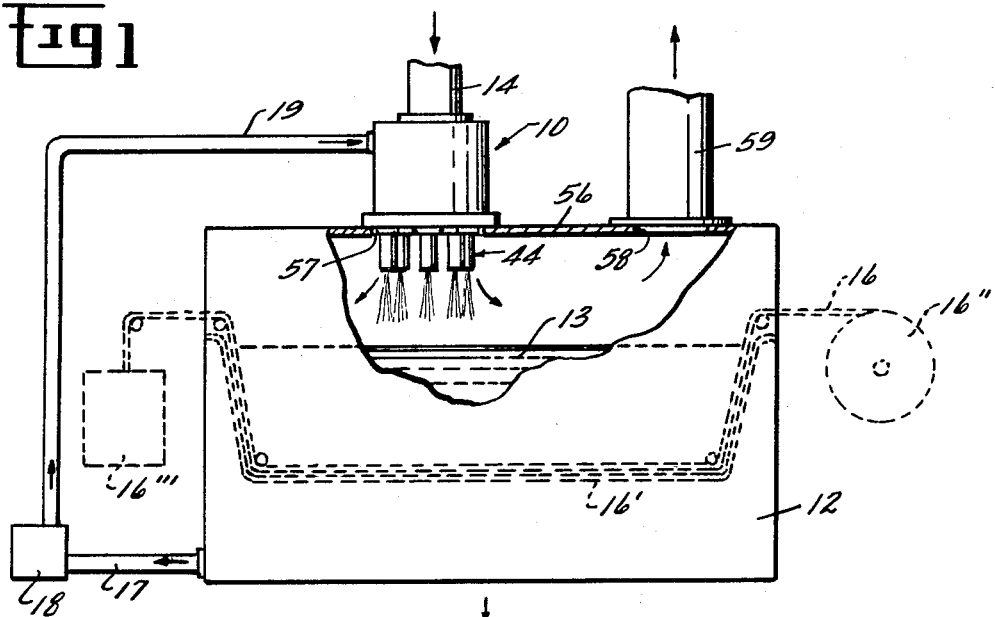
FIG. 1 is a somewhat schematic view partly in side elevation and partly in section showing a gas scrubbing system embodying a gas scrubbing device constructed in accordance with an embodiment of this invention, a filter web and filter supports being shown schematically in association therewith in dashed lines.

In FIG. 1 is shown a gas scrubbing device or gas scrubber 10 constructed in accordance with an embodiment of this invention. The gas scrubbing device 10 is mounted on a tank 12 which can hold a liquid 13 which is used for scrubbing particle containing gas which enters the scrubber 10 through a gas inlet pipe or conduit 14. An appropriate replaceable filter medium web 16 catches particles in the liquid to remove the particles from the liquid. The filter medium web is supported on appropriate supports 16' and can be supplied from a roll 16'' of filter medium web, used filter medium web being deposited in an appropriate receptacle 16'''. This type of filter is shown in greater detail in my copending application, Ser. No. 14,521, filed Feb. 26, 1970 now U.S. Pat. No. 3,618,772. Liquid from below the filter medium web 16 is drawn through a vacuum or suction line 17 by a pump 18 which discharges filtered liquid through a liquid inlet line 19 to return the liquid to the scrubber 10.

Figure 2:
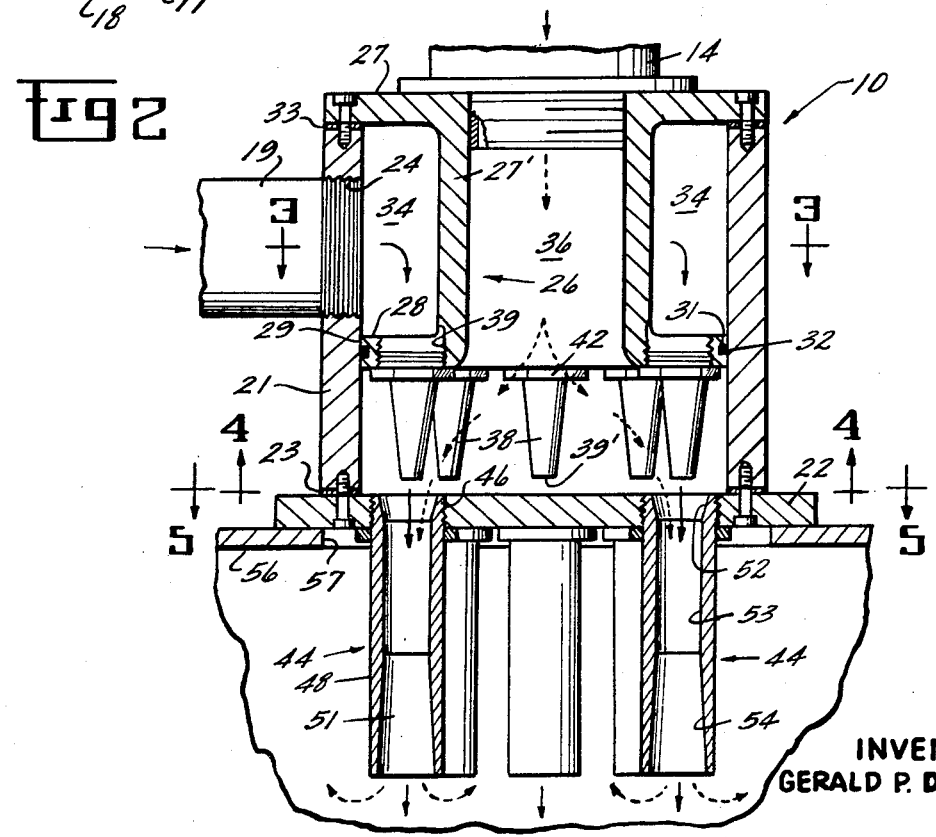
FIG. 2 is a view in transverse section on an enlarged scale of the gas scrubbing device shown in FIG. 1, parts of a tank, a liquid supply line, and a gas conduit being shown in association therewith.

Details of construction of the scrubber 10 are shown most clearly in FIG. 2. The scrubber 10 includes an annular body 21. One end of the body 21 is closed by a plate 22. An appropriate gasket 23 forms a seal between the body 21 and the plate 22. The liquid inlet line 19 extends through an opening 24 in the body 21. At the opposite end of the body 21 is mounted an annular housing 26. The housing 26 is of generally U-shape in cross section and includes an upper arm 27 which has an outer portion overlying the housing 21, a base portion 27' which extends downwardly spaced inside the wall of the body 21, and a lower, outwardly extending arm or flange 28 having an outer face 29 provided with an annular slot 31 in which is mounted an appropriate sealing ring 32 which forms a seal between the lower arm 28 and the body 21. An appropriate gasket 33 forms a seal between the upper arm 27 and the body 21. The housing 26 defines an annular space 34 inside the body 21 in communication with the liquid inlet line 19 and a central opening or cavity 36 in communication with the gas inlet pipe 14.

A plurality of jet nozzles 38 is mounted in openings 39 in the lower arm 28 of the housing 26. The jet nozzles receive liquid from the annular space 34 and direct the liquid downwardly in streams parallel to the axis of the body 21. Discharge ends 39' of the jet nozzles are in communication with the central cavity 36. Details of construction of one of the jet nozzles 38 are shown in FIG. 7. The nozzle 38 includes a threaded shank 41 which is received in one of the openings 39, an outwardly extending flange 42 which, as shown in FIG. 4, can be hexagonal in shape, and a generally frusto-conic nozzle body 43 (FIG. 7) extending downwardly therefrom. The jet nozzles 38 are substantially equally spaced around the central cavity 36 and draw from all sides of the central cavity. For best results, approximately eight jet nozzles 38 are used. Each of the jet nozzles 38 discharges into a tubular mixing chamber member 44, as shown in FIG. 2. The mixing chamber members are mounted in openings 46 in the plate 22, which closes an end of the central cavity 36 adjacent the discharge ends of the jet nozzles. Details of construction of one of the mixing chamber members 44 are shown in FIGS. 6 and 8. The mixing chamber member 44 includes an upper threaded shank portion 47 which is received in one of the openings 46 of the plate 22, a body 48 and a collar 49 mounted on the body.

An opening 51 extends along the axis of the mixing chamber member 44. The opening 51 includes an upper portion 52 of frusto-conic shape having a downwardly contracting wall, an elongated central chamber portion 53 having a cylindrical wall, and a lower frusto-conic discharge portion 54 having a downwardly expanding wall. Liquid such as water from the jet nozzles 38 draws particle-containing gas, such as exhaust gases from a smelter or the like into the interior of the mixing chamber member where the liquid wets particles carried by the gas so that the particles are carried by the liquid as the mixture of gas and liquid is discharged into the tank 12. As shown in FIG. 2, the scrubber 10 is mounted on an upper wall 56 of the tank 12 with edges of the plate 22 resting on the upper wall 56 and the mixing chamber members 44 extending through an opening 57 in the upper wall 56. The plate 22 is attached to the upper wall 56 by appropriate screw fasteners 57' (FIG. 5). Scrubbed gas is released through an opening 58 (FIG. 1) in the upper wall 56 to a vent pipe 59 through which the scrubbed gas is discharged. As already pointed out, the liquid from the mixing chamber members 44 passes through the filter medium web 16, and the particles carried by the liquid are caught by filter medium web 16.

In the drawing, eight nozzles and associated mixing chamber members are shown. However, a greater number of nozzles and mixing chamber members can be employed, with particularly good results being obtained with at least eight nozzles.

The gas scrubber is compact in construction and provides a plurality of jets which are arranged around the central opening 36 and draw particle-containing gas from the central opening and violently mix the gas and liquid to insure intimate contact between the liquid and the gas so that substantially all the particles carried by the gas are wet by the liquid and are scrubbed from the gas. The portions of the gas scrubber where most wear occurs, namely, the jet nozzles 38 and the mixing chamber members 44, are readily removable and replaceable. The gas scrubber construction illustrated in the drawings and described above is subject to structural modification without departing from the spirit and scope of the appended claims.

Having described my invention, what I claim as new and desire to secure by letters patent is:

1. A gas scrubbing device which comprises an annular body, a housing of substantially U-shape in section mounted inside the body and defining an annular space between the body and the housing and a central cavity inside the housing, means for introducing a liquid under pressure into the annular space, means for directing particle-containing gas into the central cavity, a plurality of jet nozzles receiving liquid from the annular space and mounted in a flange of the housing, discharge ends of the jet nozzles being in communication with the central cavity, means for closing an end of the central cavity adjacent discharge ends of the jet nozzles, the means for closing the end of the central cavity being a wall extending transversely of the direction of introduction of the particle containing gas to cause divergent turbulent flow of the particle containing gas at the jet nozzles, there being openings in the closing means aligned with the discharge ends of the jet nozzles, there being mixing chambers receiving liquid from the nozzles and particle-containing gas from the central cavity to mix the gas and liquid intimately to scrub the particles from the gas, means for receiving a mixture of gas and liquid from the mixing chambers and separating the gas from the liquid and particles carried by the liquid, and means for separating particles carried by the liquid from the liquid.

2. A gas scrubbing device as in claim 1 wherein the means for directing particle-containing gas into the central cavity is at the end of the housing opposite to the closing means and the jet nozzles are directed parallel to the axis of the housing and away from said directing means and the jet nozzles are arranged around the central cavity to draw from all sides thereof.

3. A gas scrubbing device as in claim 2 wherein there are at least eight jet nozzles substantially equally spaced around the central cavity.

4. A gas scrubbing device as in claim 1 wherein each of the mixing chambers includes an inwardly contracting frusto-conic inlet section, an elongated cylindrical central mixing section, and an outwardly expanding frusto-conic discharge section.

5. A gas scrubbing device as in claim 1 wherein a second flange of the housing is attached to an end of the housing remote from the closed end, the gas directing means directs particle-carrying gas into the central cavity at the second flange and axially of the housing, the jet nozzles are directed parallel to the axis of the housing and away from the gas directing means, and the jet nozzles are substantially equally spaced around the central cavity.

6. A gas scrubbing device which comprises an annular body defining a chamber having an open end and a bottom spaced therefrom, a spool-like housing of substantially U-shape in radial section mounted inside the body and extending from adjacent the open end toward the bottom and defining an annular space between the body and the housing and a central cavity inside and extending through the housing into communication with the chamber, means for introducing a liquid under pressure into the annual space, means for directing particle-containing gas into the central cavity, a plurality of jet nozzles receiving liquid from the annular space and mounted in a flange of the housing radially outwardly of the central cavity projected and adjacent and spaced from the said bottom, discharge ends of the jet nozzles being in communication with the chamber and extending toward said bottom, the portion of the bottom opposite the central cavity being imperforate and extending transversely of the direction of introduction of the particle-containing gas to cause divergent turbulent flow of the particle-containing gas in the chamber between the nozzle carrying the flange and the bottom, there being openings in the bottom opposite and aligned with the discharge ends of the jet nozzles, there being mixing chambers secured to the body in alignment with the openings for receiving liquid from the nozzles and particle-containing gas from the chamber to mix the gas and liquid intimately to scrub the particles from the gas, means for receiving a mixture of gas and liquid from the mixing chambers and separating the gas from the liquid and particles carried by the liquid, and means for separating particles carried by the liquid from the liquid.

7. In a device according to claim 6, the body being readily demountable from the gas and liquid mixture receiving means whereby the mixing chambers may be easily replaced when worn.

8. In a device according to claim 6, the spool-like housing with nozzles mounted thereon being releasable to slide out of the chamber for examination, servicing and replacement of nozzles.

9. In a device according to claim 6, the body being readily demountable from the gas and liquid mixture receiving means whereby the mixing chambers may be easily replaced when worn and the spool-like housing with nozzles mounted thereon being releasable to slide out of the chamber for examination, servicing and replacement of nozzles.

* * * * *